No. 842,013. PATENTED JAN. 22, 1907.
C. T. RIDGELY.
CUTTING TOOL.
APPLICATION FILED MAY 19, 1906.

2 SHEETS—SHEET 1.

WITNESSES:
William F. Bauer.
Irvin Miller.

INVENTOR.
Charles T. Ridgely
BY
ATTORNEY.

THE NORRIS PETERS CO., WASHINGTON, D. C.

No. 842,013. PATENTED JAN. 22, 1907.
C. T. RIDGELY.
CUTTING TOOL.
APPLICATION FILED MAY 19, 1906.

2 SHEETS—SHEET 2.

Witnesses
William F. Bauer.
Irvine Miller.

Inventor
Charles T. Ridgely
By H. A. Toulmin.
Attorney

THE NORRIS PETERS CO., WASHINGTON, D. C.

UNITED STATES PATENT OFFICE.

CHARLES T. RIDGELY, OF SPRINGFIELD, OHIO, ASSIGNOR TO THE STANDARD TRIMMER COMPANY, OF SPRINGFIELD, OHIO, A CORPORATION OF OHIO.

CUTTING-TOOL.

No. 842,013.     Specification of Letters Patent.     Patented Jan. 22, 1907.

Application filed May 19, 1906. Serial No. 317,745.

*To all whom it may concern:*

Be it known that I, CHARLES T. RIDGELY, a citizen of the United States, residing at Springfield, in the county of Clark and State of Ohio, have invented certain new and useful Improvements in Cutting-Tools, of which the following is a specification, reference being had therein to the accompanying drawings.

This invention relates to cutting-tools, and more particularly to that class of cutting-tools commonly known as "paper-trimmers," being designed primarily for use in trimming the edges of wall-paper, window-shades, and other materials.

The instrument is of the type employed in connection with a straight-edge having a guide thereon, the tool comprising a gage, which fits and travels on the guide, and a head, preferably spring-supported, pivotally connected to the gage and carrying a rotatory cutting-disk.

The invention has for its object simplicity of construction, reduced cost of production, facility of assembling and taking apart, and efficiency in operation.

To these ends my invention consists in certain novel features, which I will now proceed to describe and will then particularly point out in the claims.

Figure 1:
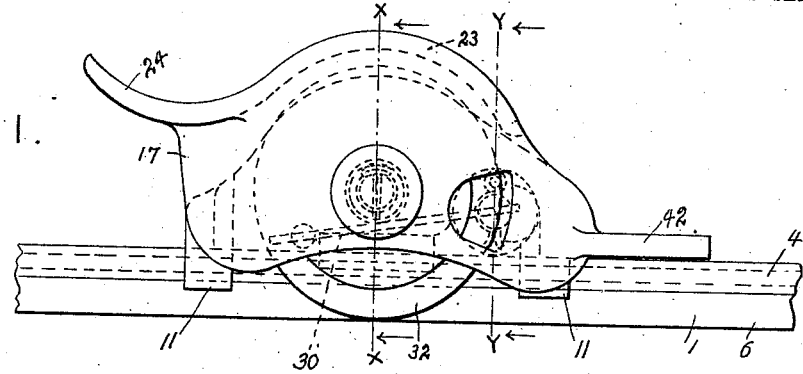
Figure 2:
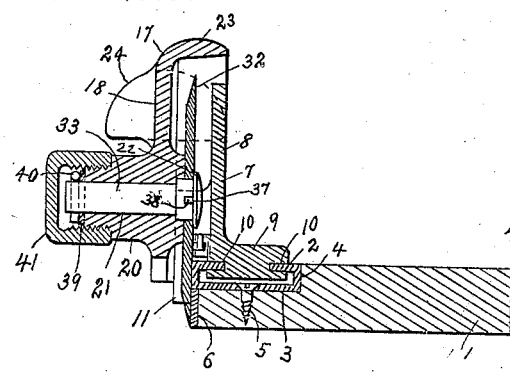
Figure 3:
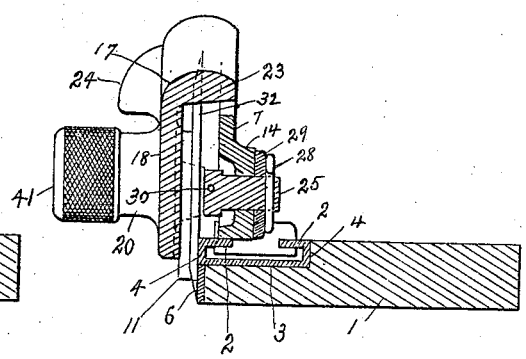
Figure 12:
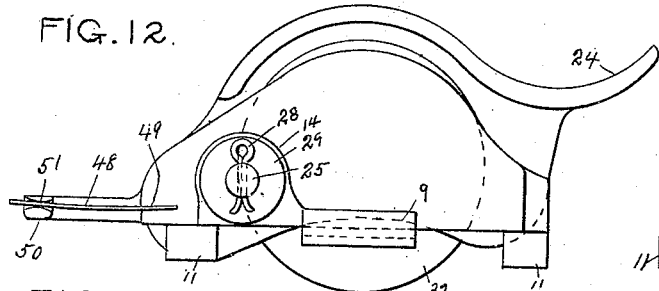
Figure 14:
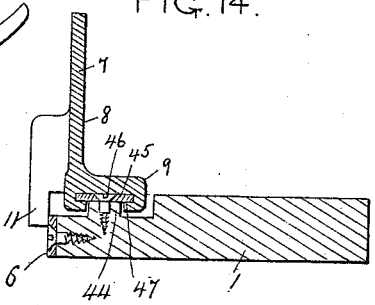
Figure 13:
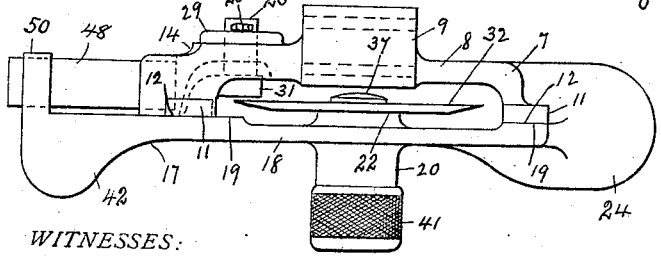
Figure 4:
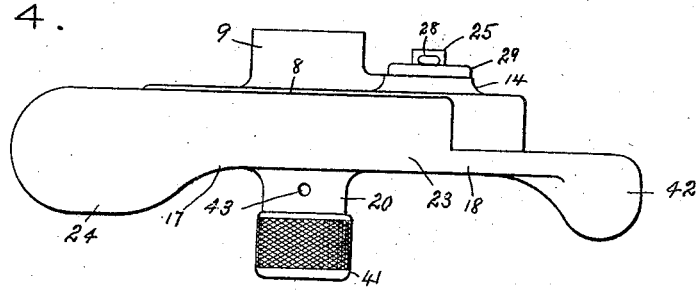
Figure 5:
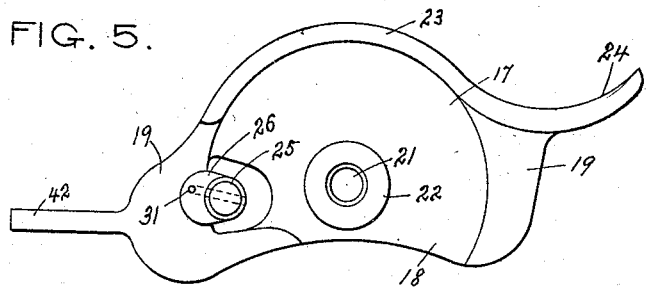
Figure 8:
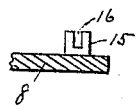
Figure 6:
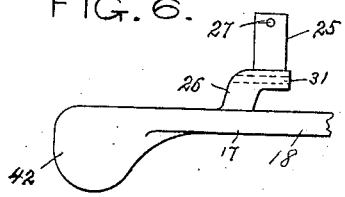
Figure 7:
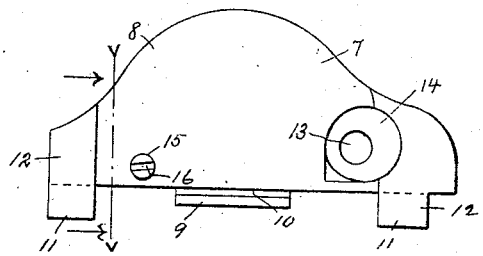
Figure 9:
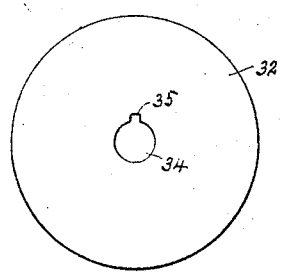
Figure 10:
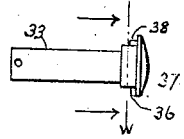
Figure 11:
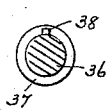

In the accompanying drawings, Figure 1 is an elevation of what may be termed the "front" of the cutter, the same being shown in position upon the straight-edge. Fig. 2 is a sectional view taken on the line *x x* of Fig. 1 and looking in the direction of the arrows. Fig. 3 is a sectional view taken on the line *y y* of Fig. 1 and looking in the direction of the arrows. Fig. 4 is a plan view with the straight-edge omitted. Fig. 5 is a view of the inner face of the head detached. Fig. 6 is a detail sectional view taken through Fig. 5, illustrating the construction of the pivot-stud and its bracket. Fig. 7 is a view of the inner face of the gage detached. Fig. 8 is a detail sectional view taken on the line *v v* of Fig. 7 and looking in the direction of the arrows, illustrating the slotted pin which engages one end of the spring. Fig. 9 is a detail view of the cutting-disk detached. Fig. 10 is a detail view of the arbor on which the cutting-disk is mounted, detached. Fig. 11 is a detail sectional view taken on the line *w w* of Fig. 10 and looking in the direction of the arrows. Fig. 12 is a view of the tool opposite to that shown in Fig. 1, said figure also illustrating a modified form of supporting-spring. Fig. 13 is a bottom plan view of what is shown in Fig. 12, and Fig. 14 is a view similar to Fig. 2 with the head and the parts carried thereby omitted, illustrating a modified form of the guide and gage.

Referring to the said drawings, 1 indicates a straight-edge of any approved construction, having a guide along one of its margins. This guide, in the construction shown in Figs. 1, 2, and 3, is formed by means of a metallic guide-strip comprising two horizontal flanges 2 extending toward each other, the body 3 of the guide-strip preferably having its margins bent up, as indicated at 4, and then inward, as indicated at 2, to form these guide-flanges. The body 1 of the straight-edge, which is usually of wood, is rabbeted or cut away along its top at the front edge thereof, to receive the metallic guide-strip, which latter may be secured in position by means of screws 5. The outer vertical edge 4 of the guide-strip forms a facing for a portion of the front face of the straight-edge, and this facing may be completed by an additional metallic strip 6.

The gage (indicated as a whole by the reference-numeral 7) comprises a vertical body portion in the form of a web or plate 8, the same having formed thereon centrally at its bottom a guide-block 9, having lateral guiding-grooves 10, which fit the guide-flanges 2, the gage being engaged with the guide by slipping the guide-block into position in the guide at one end of the straight-edge. When thus engaged, it will be seen that the gage is firmly held against tilting or lateral displacement and at the same time firmly and accurately guided. In order to relieve the guide of excessive strain, the gage is provided on its front face with downwardly-extending projections 11, which bear against the front face of the straight-edge. These projections or extensions also furnish a means for providing more extensive lateral bearing-surfaces on the inner face of the gage for the opposing bearing-surfaces of the head. These bearing-surfaces of the gage are indicated by the reference-numeral 12 in Fig. 7 of the drawings, and it will be seen that they extend downward so as to be coextensive with the extensions or projections 11, thereby extending the bearing-surfaces to the lowest point of the gage and well below the top of the straight-edge. The gage is provided with a pivot-aperture 13, preferably formed in a boss or raised portion 14, and is further provided on its inner face with a pin or stud 15, having a slot 16 formed in its free end.

The head (indicated as a whole by the reference-numeral 17) is composed of a body portion in the form of a vertical web or plate 18, on the inner face of which, opposite the bearing-surfaces 12 of the gage 7, there are formed corresponding and coöperating bearing-surfaces 19, as shown more particularly in Fig. 5 of the drawings. The head is provided with a bearing-sleeve 20, projecting from its outer side, and the aperture 21 of this sleeve, which extends through the web or body 18 of the head, is surrounded on the opposite or inner side of said head by a bearing-surface 22, preferably annular in form, as shown in Fig. 5. The head is provided at its upper portion with a laterally-extending flange 23, which overlaps and covers the upper edge of the body 8 of the gage 7. At the rear end of the head this flange 23 is broadened out to form a thumb-piece or hand-rest 24 to receive the thumb or ball of the thumb of the operator. Near its other or front end the head is pivotally connected to the gage, this construction being effected by means of a pivot-stud 25, which fits in the pivot-aperture 13 of the boss 14 and extends beyond the same, projecting beyond the rear face of the gage. This pivot-stud in order to increase the leverage and obtain a maximum amount of pressure at the working portion of the edge of the cutting-disk proportionately to the pressure applied to the hand-piece 24, is located close to the bearing-sleeve 20, in which the arbor of the cutting-disk is mounted, the distance between the axes of said bearing-sleeve and pivot-stud being less than the distance from the axis of the bearing-sleeve to the edge of the cutting-disk. The pivot-stud thus lies within the margin of the cutting-disk, or partially so, and since the cutting-disk lies between it and the body 18 of the head said pivot-stud is supported from the head by which it is carried through the medium of a bracket 26, bent, as shown in Fig. 6, to extend over and accommodate the edge of the disk. The pivot-stud 25 is provided with an aperture 27 near its outer end, adapted to receive a split pin 28, and a washer 29 is interposed between said pin and the outer face of the boss 14, the construction being such that when the pivot-stud 25 is passed through the pivot-aperture 13 until the bearing-surfaces 12 and 19 on the inner faces of the gage and head are in proper contact the washer 29 and pin 28 will hold the parts snugly together without lost motion and with the bearing-surfaces in proper contactual relation. By the construction described I avoid the use of the pivot-screws heretofore employed for this purpose and do away with all threading at this connection. It will also be seen that the pivotal connection is such that the parts may be readily and accurately assembled and as quickly taken apart, while the danger of accidental disconnection is reduced to a minimum.

The form of supporting-spring illustrated in Figs. 1, 2, and 3 consists of a resilient piece of steel wire 30, one end of which is secured in the bracket 26, which is provided with an aperture 31, formed therethrough for the purpose. The other end of the spring 30 fits in the slot 16 of the pin 15 on the gage 7. Thus the spring has one end connected to the gage and the other end connected to the head, and its operation is such as to tend to lift the head and the cutting-disk carried thereby, so as to hold this latter above the work when pressure is removed from the head.

The cutting-disk (indicated by the reference-numeral 32) is carried by and rotates in unison with an arbor 33, mounted in the bearing-sleeve 20. The connection between the cutting-disk and its arbor is preferably effected in the manner shown in detail in Figs. 2, 9, 10, and 11 of the drawings. In this construction the disk is shown as provided with a central eye or opening 34, having a radial notch or recess 35, while the arbor 33 is provided at that end thereof whereon the disk 32 is mounted with a collar 36, which fits the eye 34, a head or enlargement 37, against which the face of the disk abuts on one side, and a tooth or projection 38, fitting the recess 35 and forming a key which compels the disk and arbor to rotate in unison. The fit is such, however, that the disk may be readily slipped off the arbor when it is desired to disconnect them. The arbor extends through and beyond the bearing-sleeve 20, projecting past its front end and receiving a washer 39 and split pin 40, by means of which it is held in place. The washer bears against the outer end of the sleeve 20, while the disk 32 bears against the annular bearing-surface 22 on the inner face of the head 17, the distance between the pin 40 and the arbor-head 37 and the thickness of the washer 39 being so proportioned as to hold the parts firmly in this position without sufficient friction to prevent the proper revolution of the disk and arbor, while lost motion is effectually avoided. It will be seen that this connection is one which is readily assembled and taken apart, that the assembling is bound to be accurate, and that all pivot-screws and threading are done away with, thus constituting a simple and effective support for the disk and its arbor.

The securing devices at the outer end of the arbor are covered and protected by a cap 41, threaded internally and screwing over the externally-threaded outer end of the bearing-sleeve 20. This outer portion of the bearing-sleeve is made of reduced diameter, so as to bring the cap 41 practically flush with the exposed portion of the bearing-sleeve. The bearing-sleeve and its cap, considered as a whole, form a projection in the nature of a handle around which one or more of the operator's fingers are passed in operating the tool, while the ball of his thumb rests upon the handpiece or thumb-rest 24 to give the necessary pressure. The head is further provided with a forward extension 42 at the end opposite that on which the handpiece 24 is located, this extension forming a finger-piece to receive the pressure of the forefinger. When the tool is thus grasped, with the middle finger bent around the bearing-sleeve and its cap, the ball of the thumb pressing on the thumb-piece 24 on one side of the pivot and the forefinger pressing on the extension 42 on the other side of the pivot and acting to counterbalance and control the pressure at the other end, the exact amount of pressure delivered by the cutter can be controlled with great nicety.

The bearing-sleeve is provided with a lubricating-aperture 43, through which a suitable lubricant may be readily introduced and given access to the bearing-surfaces between the interior of said sleeve and the exterior of the arbor 33.

It will be seen that the construction is simple and relatively inexpensive and that the parts may be readily taken apart and as readily assembled with accuracy by an unskilled person, while the structure is at the same time so organized as to be accurate and efficient in operation as well as durable.

Modifications will readily suggest themselves to those skilled in the art, and I therefore do not wish to be understood as limiting myself strictly to the precise details of construction hereinbefore described, and shown in the accompanying drawings. For instance, the guide on the straight-edge and the coöperating guide-block carried by the gage may be constructed in any suitable manner, and in Fig. 14 of the drawings I have shown a modification in which the guide, instead of having guide-flanges extending toward each other, has guide-flanges extending in opposite directions away from each other, the guide-block being correspondingly modified. In this construction the straight-edge, which is rabbeted or cut away at its upper front corner, leaves, however, a longitudinal rib 44, on which is mounted a metallic strip 45, secured by screws 46 and having its margins overhanging or extending beyond the rib 44 at each side. The gage-block is provided with a T-shaped slot 47 to fit the guide thus constituted. Again, in Figs. 12 and 13 I have illustrated a modified form of the supporting-spring, which in this case is located on the opposite side of the pivot connecting the head and gage. In this construction a flat or leaf spring 48 is employed, secured at one end to the front end of the gage, which is slotted, as indicated at 49, to receive the same. The extension 42 is provided with a lateral projection 50, slotted, as indicated at 51, to receive the other end of said spring 48.

Having thus fully described my invention, what I claim as new, and desire to secure by Letters Patent, is—

1. A straight-edge provided with a guide having parallel horizontal flanges extending toward each other, in combination with a cutting-tool provided with a guide-block having corresponding horizontal grooves on its outer sides to receive said flanges, the space between the lower side of said groove and the bottom of said guide-block being less than the space between said flange and the bottom of said guide, substantially as described.

2. A straight-edge provided with a guide consisting of a metallic strip secured thereon and having its edges bent first upward and then horizontally inward to form guiding-flanges, in combination with a cutting-tool comprising a gage having a guide-block laterally grooved to receive said guiding-flanges, substantially as described.

3. A cutting-tool comprising a gage, a head pivotally connected therewith, and a cutting-disk rotatably mounted on the head, the distance between the axis of rotation of the cutting-disk and the axis of the pivot connecting the head and gage being less than the radius of the cutting-disk, substantially as described.

4. A cutting-tool comprising a gage provided with a bearing-aperture, in combination with a head provided with a revoluble cutting-disk thereon, said head being provided with a bracket extending over the margin of said cutting-disk and a pivot-stud carried by that portion of said bracket beyond the cutting-disk and engaging the bearing-aperture of the gage, substantially as described.

5. A cutting-tool of the character described comprising a gage and a head, the meeting faces whereof are provided with opposed bearing-surfaces, one of said members having a bearing-aperture, the other member having a pivot-stud extending through and beyond said aperture, a washer mounted on said extension, and a removable pin passing through said extension and bearing against the washer when the bearing-surfaces of the meeting faces of the head and gage are in contact with each other, substantially as described.

6. A cutting-tool comprising a gage, and a head carrying a revoluble cutting-disk, the gage having a boss provided with a bearing-aperture, the head having a pivot-stud fitting said aperture and extending through the same beyond the boss, the meeting faces of the gage and head having opposed bearing-surfaces, a washer fitting on the projecting portion of the pivot-stud and bearing against the boss, and a removable pin extending through the pivot-stud and bearing against the washer when the bearing-surfaces of the gage and head are in contact, substantially as described.

7. A cutting-tool comprising a gage, a bearing-aperture, a head, a bracket carried thereby having a stud at one end thereof, said bracket having an aperture therethrough, a stud carried by said gage and having an open slot or notch, and a spring having one end held in the aperture in said bracket and extending across the space between the head and gage and having its opposite end held in the notch of said stud on the gage, substantially as described.

8. A cutting-tool comprising a gage, and a head pivotally connected therewith and carrying a cutting-disk, said head having at its forward end, in front of the pivot, a forwardly-extending member, at its other end, back of the pivot, a thumb-piece or hand-rest, and between said extremities a lateral extension or handle, substantially as described.

9. In a cutting-tool of the character described, a head having a bearing-sleeve, in combination with an arbor mounted to rotate therein and provided at one end with a cutting-disk which bears against one end of the sleeve, the other end of said arbor projecting beyond the sleeve and being provided with a washer bearing against said end of the sleeve, and a removable pin bearing against the washer, substantially as described.

10. In a cutting-tool of the character described, a head having a bearing-sleeve, in combination with an arbor mounted to rotate therein and provided at one end with a cutting-disk which bears against one end of the sleeve, the other end of said arbor projecting beyond the sleeve and being provided with a washer bearing against said end of the sleeve, and a removable pin bearing against the washer, said end of the sleeve being externally threaded, and a screw-cap fitting said threaded end and inclosing the fastening devices of the arbor, substantially as described.

11. In a cutting-tool of the character described, a head provided with a bearing-sleeve, in combination with an arbor mounted to rotate therein and provided at one end with a cutting-disk bearing against the corresponding end of the sleeve, the other end of of said arbor projecting beyond the sleeve and being provided with fastening devices, said end of the sleeve being of reduced diameter and said reduced portion being threaded, in combination with a screw-cap fitting said threaded portion, being substantially flush with the body of the sleeve, and inclosing the projecting end of the arbor and its fastening devices, substantially as described.

In testimony whereof I affix my signature in presence of two witnesses.

CHARLES T. RIDGELY.

Witnesses:
E. O. HAGAN,
IRVINE MILLER.